United States Patent [19]

Wlodarczyk et al.

[11] Patent Number: 5,275,053

[45] Date of Patent: Jan. 4, 1994

[54] FIBER OPTIC PRESSURE SENSOR SYSTEMS

[75] Inventors: Marek T. Wlodarczyk, Birmingham; Daniel Vokovich, Ann Arbor, both of Mich.

[73] Assignee: FiberOptic Sensor Technologies, Inc., Ann Arbor, Mich.

[21] Appl. No.: 748,082

[22] Filed: Aug. 21, 1991

[51] Int. Cl.⁵ .................. G01L 9/00; G01L 19/04
[52] U.S. Cl. ........................... 73/705; 73/708; 250/227.14; 250/231.1
[58] Field of Search .............. 73/705, 708; 374/143; 250/227.14, 231.1, 227.21, 227.19, 227.16

[56] References Cited

U.S. PATENT DOCUMENTS

| | | | |
|---|---|---|---|
| 3,853,386 | 12/1964 | Ritter et al. | 350/164 |
| 4,182,935 | 1/1980 | Chown | 250/199 |
| 4,228,349 | 10/1980 | Ettenberg et al. | 250/226 |
| 4,356,396 | 10/1982 | Ruell et al. | 250/226 |
| 4,487,206 | 12/1984 | Aagard | 73/705 |
| 4,523,092 | 6/1985 | Nelson | 250/226 |
| 4,564,755 | 1/1986 | Winzer et al. | 250/227 |
| 4,678,904 | 7/1987 | Saaski et al. | 250/227 |
| 4,681,395 | 7/1987 | Lindsay et al. | 455/612 |
| 4,691,709 | 9/1987 | Cohen | 128/667 |
| 4,703,175 | 10/1987 | Salour et al. | 250/227 |
| 4,883,062 | 11/1989 | Nicholson | 128/667 |
| 4,911,015 | 3/1990 | Miller | 73/705 |
| 4,924,870 | 5/1990 | Wlodarczyk | 128/667 |
| 4,986,671 | 1/1991 | Sun et al. | 374/131 |
| 4,991,590 | 2/1991 | Shi | 128/667 |
| 5,018,529 | 5/1991 | Tenerz et al. | 128/748 |
| 5,107,847 | 3/1992 | Knute et al. | 73/705 |

Primary Examiner—Donald O. Woodiel
Attorney, Agent, or Firm—Harness, Dickey & Pierce

[57] ABSTRACT

The invention is related to numerous improvements for fiber optic measuring systems, and principally those utilizing a deformable diaphragm for sensing pressure. One aspect of the invention is providing temperature compensation for diaphragm characteristics. Temperature measurement can be achieved by using a light signal having a wavelength distribution which overlaps the cut-off characteristics of a filter positioned at the fiber sensing end. Shifting in the cut-off characteristic in response to temperature modulates the intensity of the reflected back temperature compensation signal. In another approach, temperature is measured through its differential effect on light signals having different launching conditions. With either approach, the temperature measurement is used to calibrate the output of the pressure sensitive diaphragm.

17 Claims, 9 Drawing Sheets

FIBER OPTIC PRESSURE SENSOR SYSTEMS

BACKGROUND AND SUMMARY OF THE INVENTION

This invention relates to improvements in fiber optic sensor systems, and in particular, to the provision of temperature measurement and compensation mechanisms, calibration systems, and additional improvements both in operating methodologies and design features.

Optical fiber sensing systems have found applications in various environments. For example, the measurement of intravascular blood pressure of human patients has been accomplished using equipment manufactured by the present assignee, FiberOptic Sensor Technologies, Inc. (FST) in which a diaphragm at the fiber sensing tip deforms in response to pressure differentials, and thus modulates through a reflection, a light signal sent through the fiber. Changes in the distance between the deformed diaphragm and the optical fiber end, and the diaphragm shape, modulate the amplitude of light that is reflected back into the optical fiber. Accordingly, the intensity of the returned light signal is related to pressure acting on the sensing tip.

Applicants have made numerous advancements in the technology of fiber optic sensing systems which are principally oriented toward pressure measurement. The present assignee, FST also owns U.S. Pat. Nos. 4,711,246; 4,787,396 and 4,924,870, all related to various improvements in fiber optic sensors, and which are hereby incorporated by reference. While the systems in accordance with these prior patents provide excellent performance for the intended applications, applicants are seeking to enhance the application environments which fiber optic pressure sensors may be used in.

One particularly demanding application for a pressure sensor is that of sensing within an internal combustion engine combustion chamber. There are presently numerous sensor approaches toward conducting such pressure measurement to provide real time measurement of combustion chamber pressure, which information can be used for controlling engine operating parameters such as spark timing, air/fuel ratio, exhaust gas recirculation (EGR), etc. to optimize engine performance. However, such an application is an extremely demanding one for a sensor. Extreme temperatures and temperature ranges would be encountered during use, with high accuracy and low cost required for such a product. Moreover, the combustion chamber environment exposes the sensor to intense electromagnetic fields, mechanical shock, and a corrosive atmosphere.

In assignees previously issued U.S. Pat. No. 4,924,870, a technique for compensating a fiber optic measuring system was described. That system is particularly adapted for compensating the pressure reading output of the device with respect to differences in outputs of the light sources used to inject light pulses into the fiber, fiber-to-fiber variations, and the bending effect (i.e. loss of signal resulting from curvature of the fiber). The previously described calibration scheme operates by using a reflective coating at the sensing tip end of the fiber which is reflective to a calibration light signal which is returned along the fiber, whereas the pressure measuring light signal is transmitted through the coating and is modulated by the pressure responsive diaphragm. That calibration scheme is capable of calibrating the pressure responsive light signals for all of the principal variables affecting response along the length of the optical fiber. That system is not, however, capable of compensating for parameters aside from pressure which affect the pressure measuring light signal beyond the filament end. Accordingly, although that "dual wavelength" scheme operates extremely well in environments where temperature ranges are low, and where single uses are contemplated, it has limitations in environments where extreme temperature variations and time dependent changes can be anticipated.

Temperature is the primary source of inaccuracies of high temperature fiber optic pressure sensors operated on the principal of a flexing diaphragm. Temperature fluctuations and extremes affect each of the four primary areas of these sensors including, the: sensing diaphragm; sensing tip; fiber optic link; and the associated opto-electronics and electronics. In particular, high temperature extremes, such as encountered in automotive engine combustion chambers at the sensing diaphragm, and somewhat lower temperature fluctuations at the sensing tip, are the two dominating sources of errors. Large temperature extremes change mechanical properties of the diaphragm, mostly Young's modulus, resulting in temperature dependent deflection. Temperature induced expansion of the elements of the sensing tip change the relative position of the fiber end and the diaphragm, and causes transmission changes through the fiber.

One feature of this invention is a technique for temperature compensation in diaphragm - based fiber optic pressure sensors. The technique is designed to eliminate, or significantly reduce, undesired temperature effects on the deflecting diaphragm, sensor tip, optical link, and electronic interface. An underlying principal of the compensation technique described in this specification is the simultaneous measurement of diaphragm deflection and sensing tip temperature, and real time software correction for the temperature effect.

In accordance with this invention, several methods for temperature measurement are described for enabling temperature compensation. In a first approach, a temperature sensing light signal is chosen to have a wavelength at near the cut-off wavelength (i.e. boundary between high reflectivity and high transmissivity) of a filter coating on the optical fiber end at the sensing tip. Since the cut-off wavelength of a multilayer dielectic film filter changes in accordance with temperature, the intensity of a reflected back signal for a temperature compensating light signal can be used as a measure of temperature. The wavelength can also overlap a region of a sharp peak in transmissivity which is often found in such filter coatings. Since the wavelength of such a peak will shift in response to temperature it also provides a convenient opportunity for temperature measurement.

In another technique for temperature compensation according to this invention, two light signals are injected into the optical fiber having different launching conditions. It has been found that certain transmission modes are affected by temperature in a differential manner for applicants' sensor systems. For example, a launching condition in which the injected light intensity is concentrated mostly along the outer surface of the fiber is attenuated in response to higher temperatures more so than a mode which is concentrated at the center of the fiber, which is only weakly coupled to the fiber outer surface.

Another facet of this invention is a technique for reducing the distortion effect of temperature variation and other factors beyond the optical filament end which does not require actually measuring temperature. This technique is used with dual wavelength systems as described in assignees U.S. Pat. No. 4,924,870 and involves allowing a calibration light signal to be partially transmitted and partially reflected by the filament end filter coating. This approach can be shown to reduce the span of errors which are not directly compensated for through the dual wavelength system.

In addition to the temperature effects mentioned previously, applications in which the same sensor is expected to provide measurements over a period of time gives rise to concern over time dependent changes in the sensing tip. For example, the reflectivity of the deformable diaphragm caused by oxidation or other effects can dramatically alter the intensity of the returned light signal, and hence, affect measurement. In accordance with this invention, a calibration scheme based on zero-setting the system when it is exposed to a known pressure is provided which is specifically oriented to an automotive application.

This specification further describes a temperature shielding feature for fiber optic pressure sensor tips exposed to high temperatures, such as those found in internal combustion engines. By reducing the range of temperatures to which the sensor tip is exposed, some of the temperature dependent effects can be reduced.

In applications where multiple pressure sensors are used, this invention further contemplates techniques for multiplexing a number of identical sensors performing simultaneous pressure measurement.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

This specification is directed to a number of improvements for fiber optic sensing systems. For the sake of clarity, the various categories of aspects of this invention are discussed in separate sections identified by descriptive headings. Some of the various embodiments, however, share common elements which are identified by like reference numbers.

Temperature Measurement and Compensation

Figure 1:
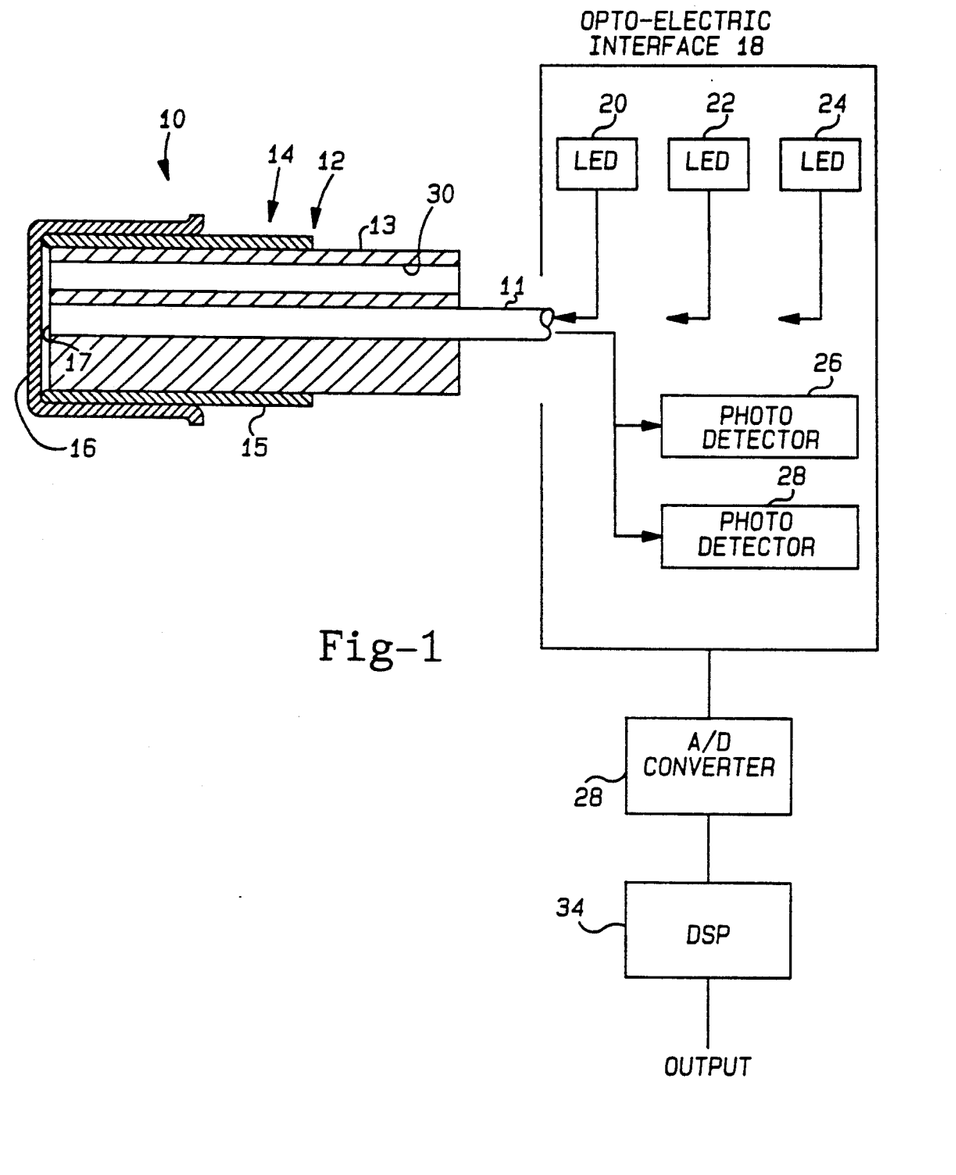
FIG. 1 is a block diagram of a pressure sensing system in accordance with a first embodiment of this invention.

A generalized fiber optic pressure sensing system is shown in FIG. 1 and is generally designated there by reference number 10. System 10 includes fiber optic cable 12 which has a sensing tip 14 at its terminal end. Optical filament 11 passes through ferrule 13 to which it is bonded or interference fit. Cylinder 15 surrounds ferrule 13. Deflectable diaphragm cap 16 has a center membrane portion which deforms in response to pressure differentials across it, and thus changes the amplitude of light launched into optical filament 11 at the opposite end of the filament which is returned back into the filament. A vent passage 19 is provided to maintain the fiber side of the diaphragm cap 16 at a desired pressure. A partially reflective dielectric filter 17, comprised of numerous layers of dielectric material, for example titanium dioxide and silicon dioxide, is deposited on the end of filament which provides a dual wavelength referencing feature such as described in applicant's previously issued U.S. Pat. No. 4,924,870.

A temperature compensating system using optical means of temperature measurement according to an embodiment of this invention is shown in FIG. 1. The system 10 consists of an opto-electronic interface 18 containing three LEDs 20, 22 and 24, each emitting light in distinct wavelength bands; photodetectors 26 and 28; and a coupler (not shown) for launching light from the LEDs into optical filament 11, and directing the returned signals to be incident on the photodetectors. Some of the light from the LED's is directed to fall on photodetector 26 which provides a source intensity reference. Three output signals from the opto-electronic interface 18 are converted into a digital form by A to D converter 28 and transmitted to digital signal processing (DSP) module 34. These three signals are related to the intensity of the returned signals of the three LEDs. The outputs of module 30 are pressure and temperature readings.

The DSP module 34 and associated host microprocessor control the operation of LEDs 20, 22 and 24, and perform real time computations and conversions. A computation algorithm is used to deconvolve temperature effects from the pressure output and is derived from the fundamental relationships between diaphragm deflection, pressure, and temperature. Experimentally derived correction factors may be also used as inputs to the compensation algorithm.

The deflection of the diaphragm cap 16 is measured using the dual wavelength technique described in U.S. Pat. No. 4,924,870 in which the light signal from LED 20 is reflected by filter layer 17, whereas the light pulse from LED 24 passes through the filter to be modulated by diaphragm cap 16. The use of the referencing wavelength from LED 20 in this approach permits compensation for environmental effects on the system such as vibration, connector instability, bending effects, and some of the sensing tip sensitivities.

Fiber optic temperature measurement of the sensor tip 14 is performed in a novel way according to this invention and does not require any modifications to the sensor designed for dual wavelength operation but instead only requires modifications to interface 18. This is an important consideration for price sensitive applications, such as in automobiles, where the price of replaceable elements has to be very low. In essence, temperature is measured by monitoring the intensity of the third wavelength produced by LED 2 returned into the fiber at sensing tip 14, and time division multiplexed the signal from photodetector 28 with the other two wavelengths. This temperature sensitive wavelength is selected such that the corresponding signal is most sensitive to temperature changes at the sensor tip 14. One location for the wavelength is between the other two wavelength bands produced by LEDs 20 and 24, and overlapping with the cut-off wavelength of filter 17.

Figure 2A:
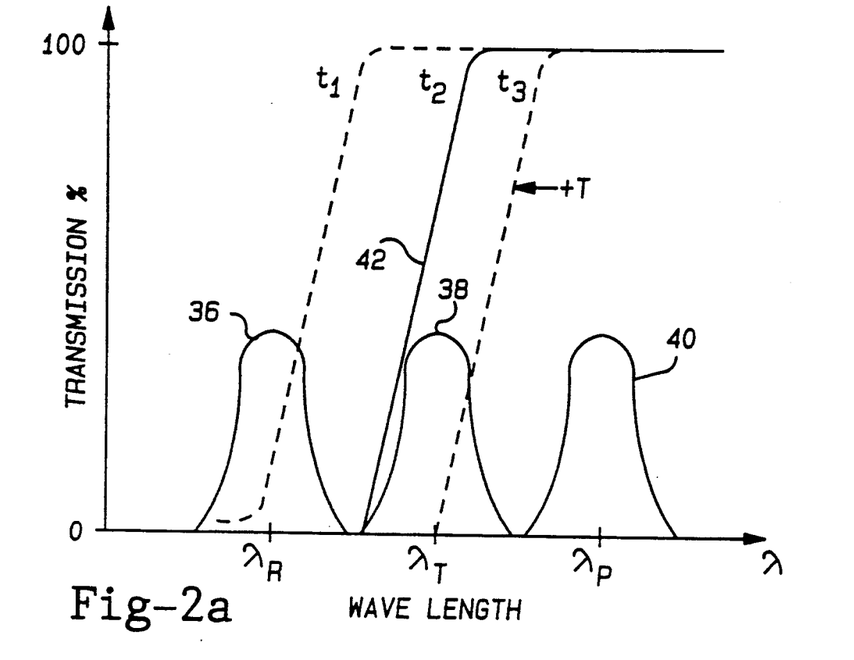
FIG. 2a is a wavelength versus transmission spectrum showing three different wavelength sources and the transmission characteristic of a optical filament filter coating used to provide temperature compensation in accordance with an embodiment of this invention.

In FIG. 2a, the output spectra of LEDs 20, 22 and 24 are shown as curves 36, 38 and 40, and can be designated as the reference, temperature and pressure sensitive wavelengths, respectively. Under varying temperature, the cut-off slope of filter 17, designated by curve 42, moves around its nominal position at a temperature $T_2$. As temperature increases to $T_1$ the cut-off slope moves towards shorter wavelengths, increasing the intensity of the transmitted temperature sensing wavelength (lambda$_t$). If the coating parameters are correctly selected, the transmission levels of the reference wavelength light (lambda$_r$) and the pressure sensitive wavelength light (lambda$_p$) change very little.

Figure 2B:
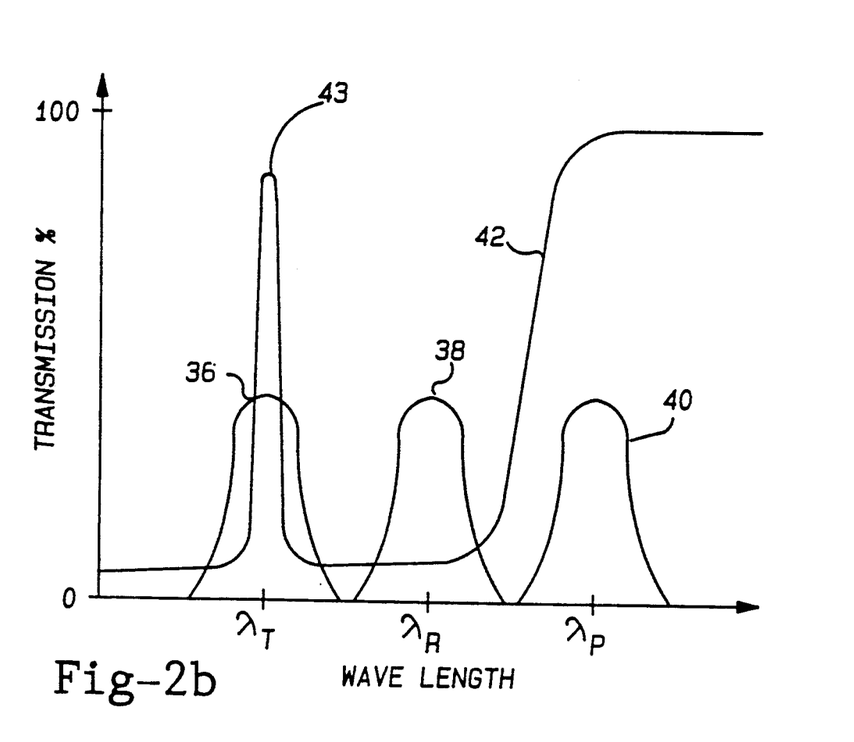
FIG. 2b is a wavelength versus transmission spectrum showing three different wavelength sources like that shown in FIG. 2a but showing a peaked transmission response of the filter coating overlapping one source for temperature sensitivity.

The cut-off slope of the transmission curve is not the only temperature sensitive range of the curve. A region of the curve exhibiting the side-lobe behavior, as shown in FIG. 2b designated by reference number 43, exhibits possibly even higher temperature sensitivity because it is typically narrow than the line-width of LED 20 and it shifts by the same amount that the cut-off slope does. By overlapping the temperature measuring wavelength 36 on the side-lobe 43, an alternative temperature measuring technique is possible, as shown schematically in FIG. 2b.

The temperature dependent changes in lambda$_t$ are obtained by taking a ratio of the signals at lambda$_p$ and lambda$_t$ where:

$$v_t(t) = V_t(p,t)/V_p(p)$$

and $$V_t(p,t) = V_t(t) * V_t(p)$$

$V_p(p,t)$ is the intensity of lambda$_p$, and $V_t(p,t)$ of lambda$_t$. Note that $V_t$ is modulated by both pressure and temperature, however the ratio $v_t$ depends only on temperature. In operation, the LEDs 20, 22 and 24 would be fired sequentially with the output of photodetector 28 gated to ensure output synchronization.

Several issues have to be addressed to ensure the practicality of the above described techniques. For typical LEDs, such as those outputting light in the following wavelength bands with maximum wavelengths at; 730 nm, 840 nm, and 950 nm, their line widths may have to be restricted by band-pass filters (not shown). The purpose of such filters is to reduce the spectral overlap of the LEDs and consequently improve the accuracy of the temperature measurement.

Figure 3:
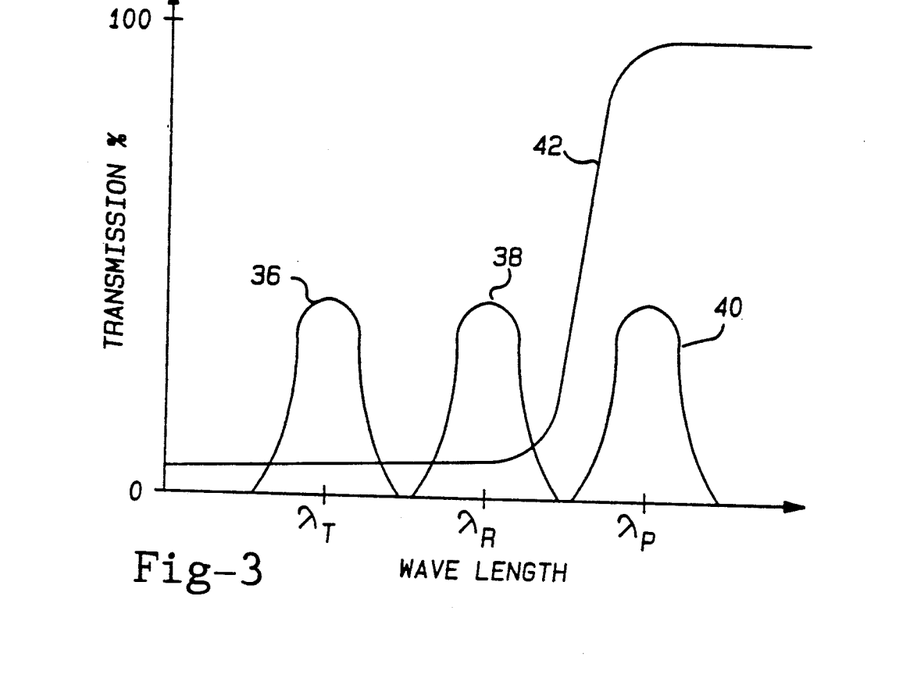
FIG. 3 is a wavelength versus transmission spectrum showing a method for temperature compensation based on differential temperature modulation of light signals based on their launching conditions.

Temperature sensing is also possible within a flat portion of the transmission curve as shown in FIG. 3. A necessary condition is that the temperature sensing wavelength is differently affected by temperature than the referencing wavelength. A novel technique, and an alternative to the technique described above, is to differentiate the temperature effect between the referencing and temperature sensing wavelengths through the differentiating of the launching conditions between the two wavelengths. This can be accomplished in a simple manner in optoelectronic interface 18 by restricting the numerical aperture of the pressure and reference sensing LEDs (underfilling the launch) or overfilling the modes for the measuring wavelengths. For short fibers, such as of interest here, the launching condition at interface 18 is very well preserved all the way to sensing tip 14 and back to the interface such that the two wavelengths have different modal distributions. This inventor has found that the light signals are differentially affected by temperature. For the temperature changes of the order of hundreds of degrees Centigrade, relatively small differences in launching condition result in significantly different temperature sensitivities. As an alternative embodiment, two LEDs having identical wavelength outputs could be used if they are launched significantly differently into the fiber.

A different launch condition may result, in principle, in somewhat different sensitivity to filament bending, and fiber or connector instabilities. However, temperature effects at sensing tip 14 are so large that the launching mismatch needed for temperature measurement does not significantly affect sensitivities to other environmental effects.

Figure 4:
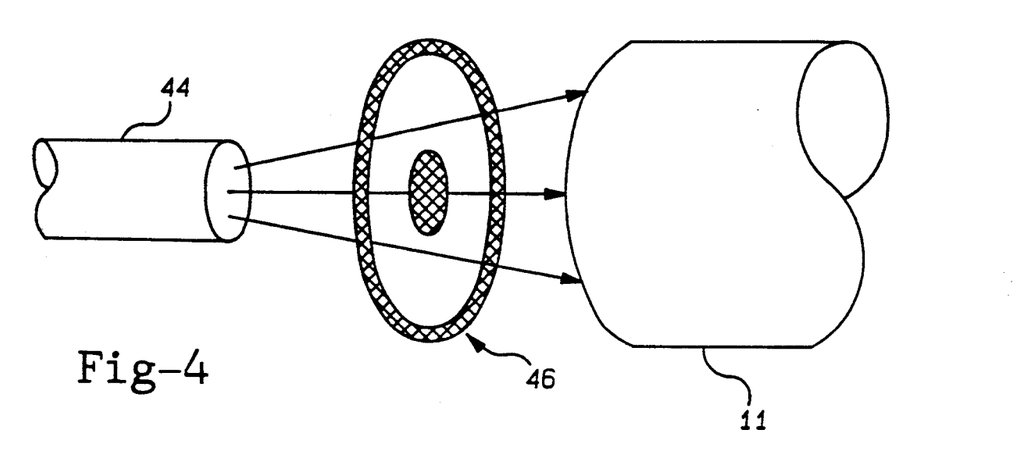
FIG. 4 is a pictorial view showing a light source providing a launching condition for an inputted light which produces maximum intensity near the fiber outer surfaces.
Figure 5:
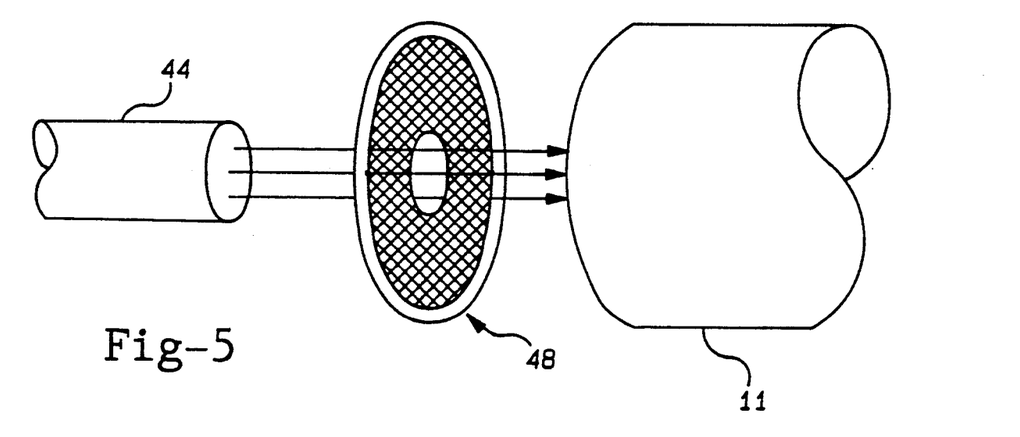
FIG. 5 is a pictorial view showing a light source providing a launching condition for an inputted light which produces maximum intensity near the fiber center.

FIGS. 4 and 5 provide simplified illustrations of techniques for providing different launching conditions for two signals which are differentially affected by temperature. In FIG. 4, LED 44 is shown projecting light through aperture 46 and into fiber optic filament 11.

Aperture 46 has the property that it blocks light from entering at near the center longitudinal axis of filament 11 and, therefore, produces a maximum intensity distribution which is near the radially outer surface of the filament. As mentioned previously, this launching condition is well preserved along filament 11 and, therefore, an intensity distribution of light through any cross-section of the filament will reveal peak intensities near the outer surface of the filament. FIG. 5 is similar to FIG. 4, except showing aperture 48 which produces a maximum intensity along the central longitudinal axis of filament 11. In that launching condition, a maximum light intensity distribution will be found around the center core area of the filament. While various explanations for a differential temperature effect between the launching condition providing by FIG. 4 versus FIG. 5 can be provided, one theory is the mechanical stresses generated along the outer surfaces of filament 11 cause distortion in the outer surface of the filament, especially in the area of contact with ferrule 13, leading to greater leakage of the off-axis launched light of FIG. 4, as compared with the on-axis light of FIG. 5, where such surface phenomena have a relatively small effect.

The effectiveness of the temperature compensation described in this invention depends on the ability of accurately relating the signals $v_p$ and $v_t$. In principal, these signals are coupled through three effects: the fundamental thermo-mechanical properties of the diaphragm cap 16 material, the temperature expansion of the elements of sensing tip 14, and the pressure and temperature dependent transmission changes of the optical signals. A temperature compensated pressure reading is obtained by what is equivalent to a real time inversion of the functional dependence between the changes in optical signal and diaphragm deflection, which in turn depends on both temperature and pressure as follows:

$$v_{out}(p) = F^{-1}\{v_t]v_d(p,t),t]\}$$

This inversion is realized through the use of a two-dimensional look-up table or curve fitting techniques. In practice, it is very difficult to predict exactly the functional behavior of $v_t$. Instead, $v_t$ dependence on pressure and temperature is stored in the memory of the system during a calibration process when sensing tip 14 is subjected to full operational temperature and pressure ranges.

A particular look-up or curve fitting technique is implemented based on two primary factors: the degree of the accuracy of the theoretical model, and the accuracy of the deflection and temperature readings. In an ideal situation, the correction factors are identical for all sensors and identical correction parameters are stored in the memory of the system based on an unique inversion relationship. In practice, however, some kind of individual sensor calibration needs to be instituted because of the manufacturing variability. A two (or more) point calibration technique could be implemented.

Periodic Pressure Calibration

Time dependent changes in the optical system of sensor 10 can be expected to occur resulting for example, from reflectivity changes of diaphragm cap 16, and changes in the transmission of the optical filament 11. To correct for these effects, a zero-offset technique can be implemented. In the application of measuring pressure within an automotive engine combustion chamber, "re-zeroing" of the sensor pressure output can be provided during the engine shut-off periods when the combustion chamber pressure is equal to the atmospheric pressure. Because combustion pressure does not instantaneously reach atmospheric pressure after the engine shuts down, alternative verification of the pressure equilibrium is needed. One way of doing so is to wait a certain amount of time after engine shut down. The necessary delay can be easily determined and stored electronically. In an automobile, this re-zeroing can also be performed during the regular engine status check preceding engine ignition.

Sealed Cavity Design

Figure 6:
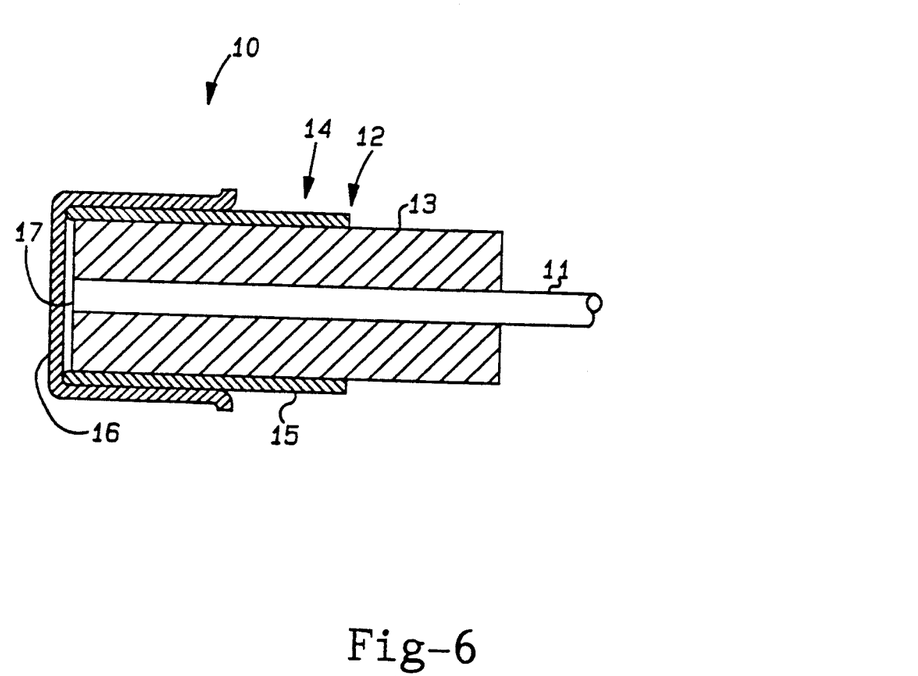
FIG. 6 is a cross sectional view of a sensing tip of this invention defining a closed gas volume acting on one side of the sensing diaphragm.

Due to prolonged use and high temperature in some applications such as combustion chamber pressure monitoring, the reflecting diaphragm 16, the optical coating 17, and the bonding material used may deteriorate over time. Periodic calibration described above will be effective if the resulting changes in optical signals are smaller than required by the dynamic range of the system. To minimize these changes, a technique of sealing of the area between the fiber 11 end face and diaphragm 16 is described here. As shown in FIG. 6, the area behind diaphragm 16 is not vented to atmospheric pressure. If a gas is used to fill this space, temperature dependent back pressure changes will result. However, this temperature effect is well behaved and will be compensated for by the temperature compensation technique described in this specification. An inert gas, such as for example argon, would be used eliminating any residues of oxygen and water vapor that are the main causes of potential optical changes inside the sensor. The sealed gas will exert pressure on diagram cap 16 as dictated by the Ideal Gas Law. The changes in this pressure would be a component of a lumped correction parameter.

As a modification to the above approach of providing a sealed cavity behind diaphragm 16, a vent passage 30 as shown in FIG. 1 could be used to enlarge the sealed volume. In such a configuration, vent passage 30 would be plugged along fiber optic cable 12 along its length or at interface 18. The advantage of such a configuration is that for some applications, such as combustion chamber pressure measurement, the average temperature of the sealed gas would be closer to ambient temperature, thus reducing the pressure change acting on diagram 16 dictated by the Ideal Gas Law, and further reducing the rate of temperature change of the trapped gas.

Sensing Tip Shielding

Another critical issue for long term accuracy and reliability of a fiber optic sensor system is the mechanical stability and durability of the material of diaphragm cap 16. In an automotive application, a diaphragm directly exposed to the combustion chamber may be subjected to temperature between −50 degrees C. and 550 degrees C. This represents a formidable environment for the most temperature resilient metals.

Figure 7:
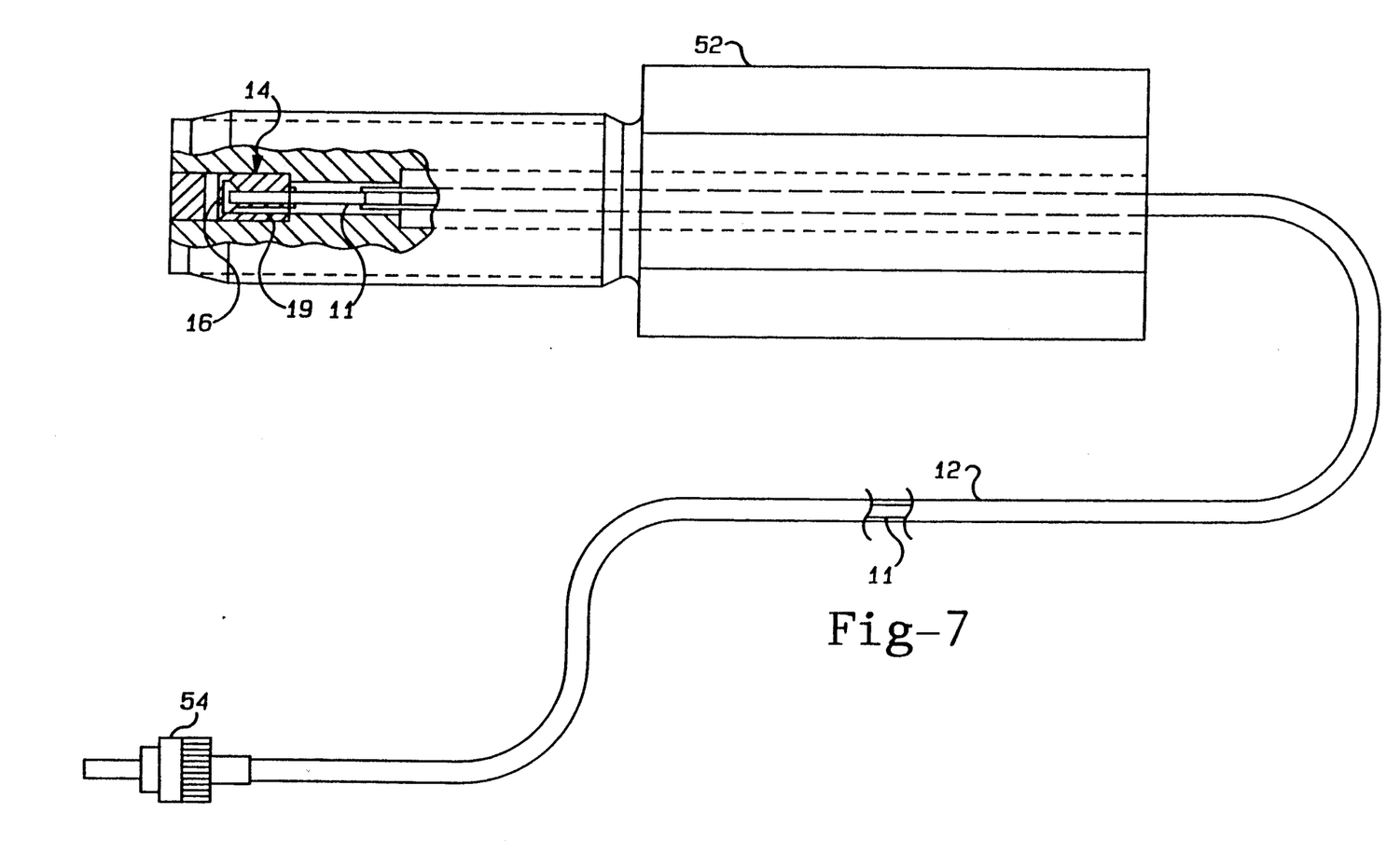
FIG. 7 is a pictorial view of a fiber optic pressure sensing tip with cable and optical connector in accordance with this invention which provides a means for shielding the deformable pressure sensing element of the sensing tip.

As a part of this invention, a technique for temperature shielding of the diaphragm is described with specific reference to FIG. 7. In FIG. 7 fiber optic cable 12 is shown specifically adapted for incorporation into an automotive internal combustion engine for measuring combustion chamber pressure. Fiber optic cable 12 is shown housed within mounting plug 52, which is threaded to be received in an associated port exposed to the combustion chamber. As an alternative design, cable 12 could be incorporated into an ignition spark plug. Mounting plug 52 has an internal cavity for supporting fiber optic cable 12. The opposite end of the cable 12 has an optical connector 54. A shield 56 is provided, positioned between sensing tip 14 and the combustion chamber. Shield 56 is made from sintered material such as that frequently employed in pressure lines. Such a material is made of pressed metal bids (can be stainless steel or brass) which form a porous structure of very high heat mass capable of rapid temperature increases. Shield 56 is in the form of a disk, a few millimeter thick, thermally coupled to mounting plug 52 and reduces temperature extremes by hundreds of degrees. Furthermore, this material does not reduce the frequency response of the sensor. By selecting the size and material of the bids, disk 56 may additionally attenuate high frequency jitter on the pressure waveforms as may result from the presence of the cavity above the sensor diaphragm. An additional benefit of placing shield 56 in front of sensing tip 14 is protection of diaphragm cap 16 against formation of deposits on its surface. Such deposits may alter the diaphragm's dynamic characteristics over prolonged operation and result in sensor inaccuracies.

Sensing Tip Compensation

The dual wavelength technique according to U.S. Pat. No. 4,924,870 and discussed previously for fiber optic pressure sensors permits compensation for environmental effects on the sensor including fiber bending, connector mechanical and thermal instabilities, and temperature induced changes in fiber transmission. However, temperature effects, and any other effects, occurring between the sensor diaphragm and the coated surface of optic filament 11 affect only the measuring wavelength and may result in sensor tip sensitivity and drift. This error may be relatively small if the temperature effect on transmission beyond filter coating 17 is small even if the sensitivity for the signals reflected by the coating is large (because this sensitivity is the same for the two wavelengths provided that their launching conditions are identical). Yet, if the temperature sensitivity beyond coating 17 is significant, as frequently encountered due to manufacturing variabilities, the error may be significant.

This aspect of the invention relates to an improvement to the dual wavelength technique that results in significant reduction in the differential effect at the tip and overall reduction in sensor error. This benefit is achieved without a direct measurement of sensing tip 14 temperature, as is conducted in accordance with the prior embodiments.

Figure 8:
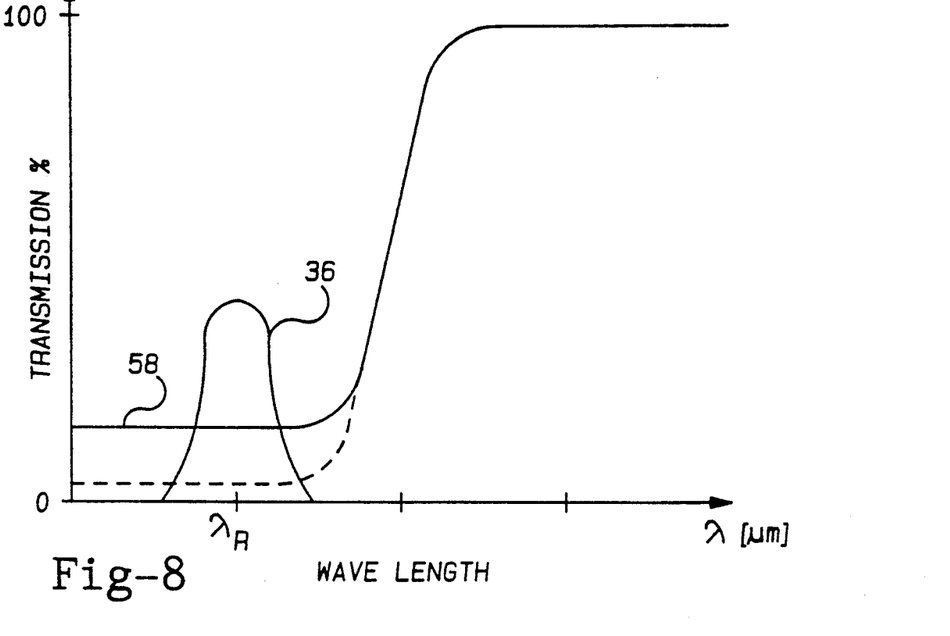
FIG. 8 is a wavelength versus transmission distribution for a system according to an embodiment of this invention for reducing calibration error by allowing a portion of the reference light signal to leak past the fiber en coating in which the transmission curve has an elevated minimum transmission characteristic.
Figure 9:
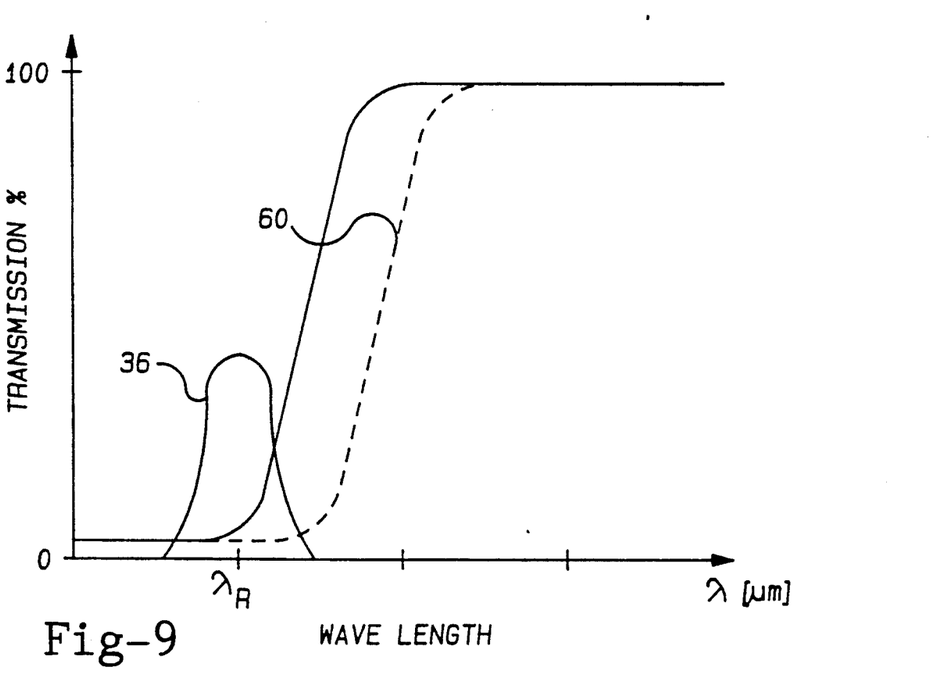
FIG. 9 is a wavelength versus transmission distribution for a system similar to that of FIG. 7 except that the filter cut-off wavelength partly overlaps the reference light source spectrum.

The basic principal of this embodiment of the invention is allowing the reference wavelength light signal to partially leak through coating 17 and benefit from the resulting larger reduction in the differential effect at sensing tip 14 compared to the reduction in the full scale pressure change (span). Referring to FIG. 8, the transmission curve of coating 17 is modified compared to the original profile shown in FIGS. 2 and 3 such that the reference signal is partially transmitted. Two approaches are depicted by the figures for allowing the reference light signal to be partially transmitted. In FIG. 8, the modified transmission curve 58 of filter 17 is shown in which the transmissance of the filter does not reach zero within the range of wavelengths of interest. As shown in FIG. 8, a large proportion of the total energy of the reference wavelength is transmitted past filter coating 17. In FIG. 9, partial leakage of the reference wavelength light signal is achieved by partially overlapping the cut-off range of filter 17 with the reference wavelength signal, using a filter with the characteristics of curve 60. Care has to be exercised in selecting an optical source such that launching condition is essentially the same for both the reference and pressure sensing wavelengths. Low bend sensitivity can be used as a test of good launch overlap.

The benefit of leaking a portion of the reference wavelength light signal stems from the dependence of the ratio of tip sensitivity and span. The intensity of the two signals can be expressed as:

$$V_i = I_i F_i (R_i + T_i^2 D)$$

Where $I_i$ is the intensity of the signals, $F_i$ is the transmission factor representing the lumped transmission coefficient of filament 11 up to the fiber end, $R_i$ and $T_i$ are the reflection and transmission coefficients, respectively, of the coating, and D is the pressure dependent reflection coefficient of the diaphragm. The voltage output of the sensor is proportional to the ratio of the signals of the previous equation.

$$V_o = V_m/V_r = (R_m + T_m^2 D)/(R_r + T_r^2 D)$$

For small changes, the difference between the temperature induced effects on the reference and pressure sensing wavelengths can be expressed as:

$$W = dI_m/I_m - dI_r/I_r = (r + 2T_m t D)/(R_m + T_m^2 D) = (r + 2 T_r t D)/(R_r + T_r^2 D)$$

where $r = dR^i/dt$, $t = dI_i/dt$

The span of the sensor can be expressed, in a small change approximation, as $$S = T_m^2/(R_m + T_m^2 D) - T_m^2/(R_m + T_m^2 D)$$

The expression for total error as a fraction of span is expressed as:

$$\text{Error} = W/S$$

Figure 10:
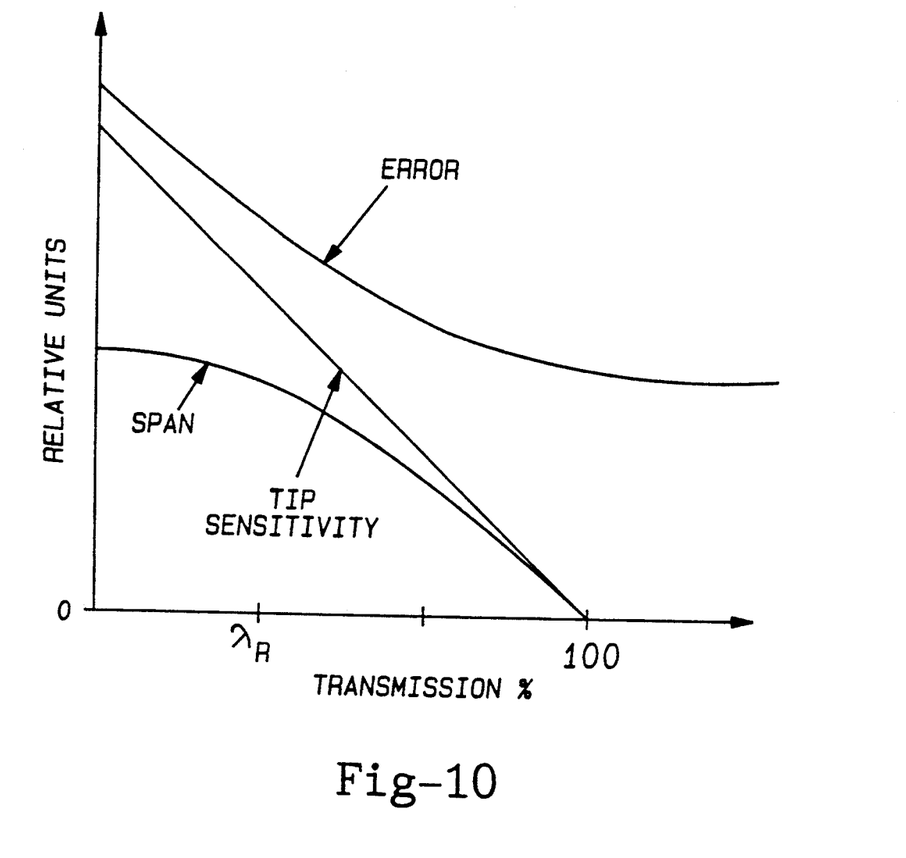
FIG. 10 is a curve showing a reduction in error attributable to operation in accordance with FIGS. 7 or 8.

The dependence of the error term on the transmission coefficient $T_r$ is schematically shown in FIG. 10 together with the dependencies of the span and tip sensitivity. Relative units are used in showing these relationships. FIG. 10 illustrates that increases in transmission coefficient results in lower error.

Sensor Multiplexing

Finally, this disclosure describes techniques of multiplexing a number of identical sensors 14a through d that can perform simultaneous pressure measurements. Such measurements are needed for automotive engine controls based on combustion pressure measured in individual engine cylinders. Two schemes are described here: a first that utilizes a single measuring photo detector as shown in FIG. 11, and a second based on multiple of measuring detectors, shown in FIG. 14.

Figure 11:
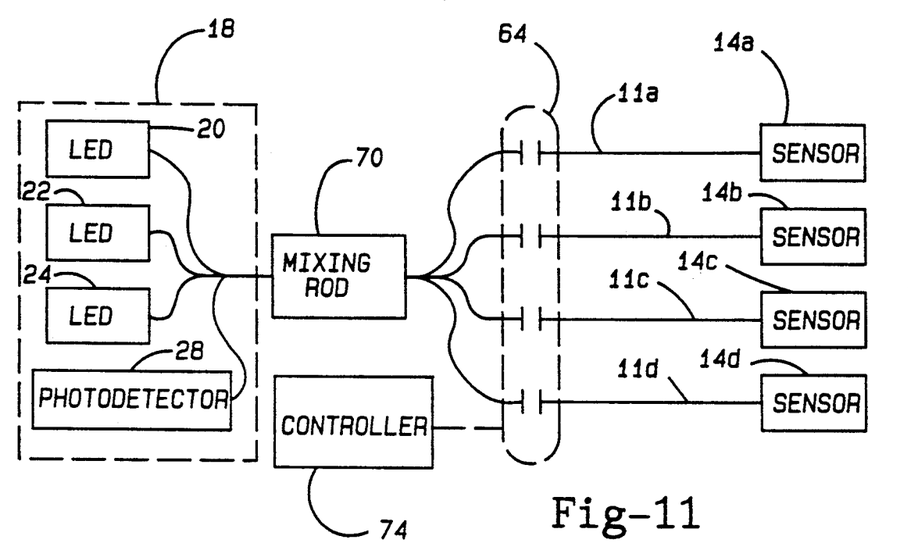
FIG. 11 is a schematic drawing of a multiplexing system in which a common photodetector is used to monitor the output from plural sensors.

The multiplexing scheme shown in FIG. 11 is a combination of three techniques: wavelength, time, and frequency multiplexing. Wavelength and time division multiplexing are used as previously described, for compensating for temperature and environmental effects acting on an individual sensor. Frequency multiplexing is employed to multiplex different sensors shown as 14a through d without increasing the complexity and cost of the opto-electronic interface 18. This modulation is realized by using electronically driven shutters integrated within an in-line connector 64 which are operated by controller 74.

Figure 12:
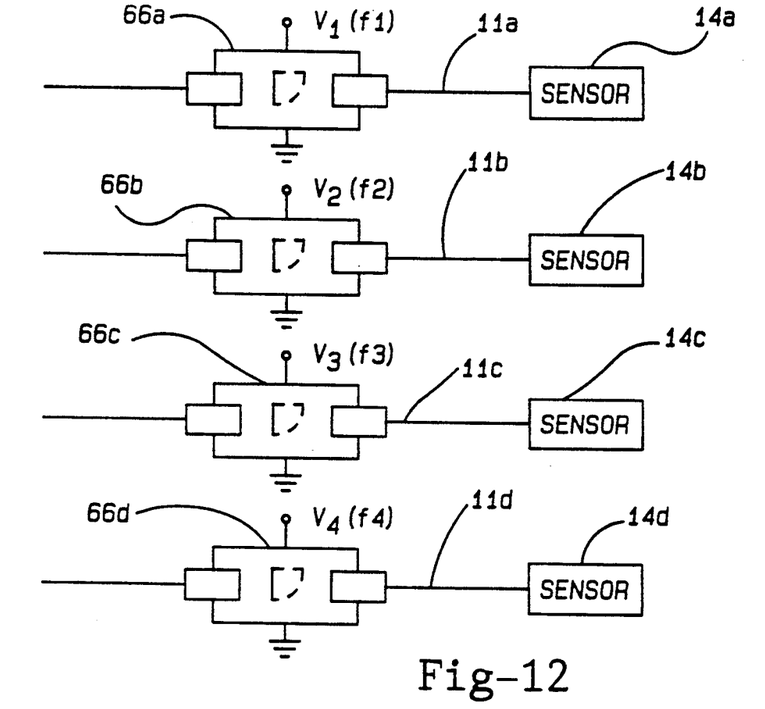
FIG. 12 shows an optical shutter system used in conjunction with the system of FIG. 11 using optoelectric shutters.
Figure 13:
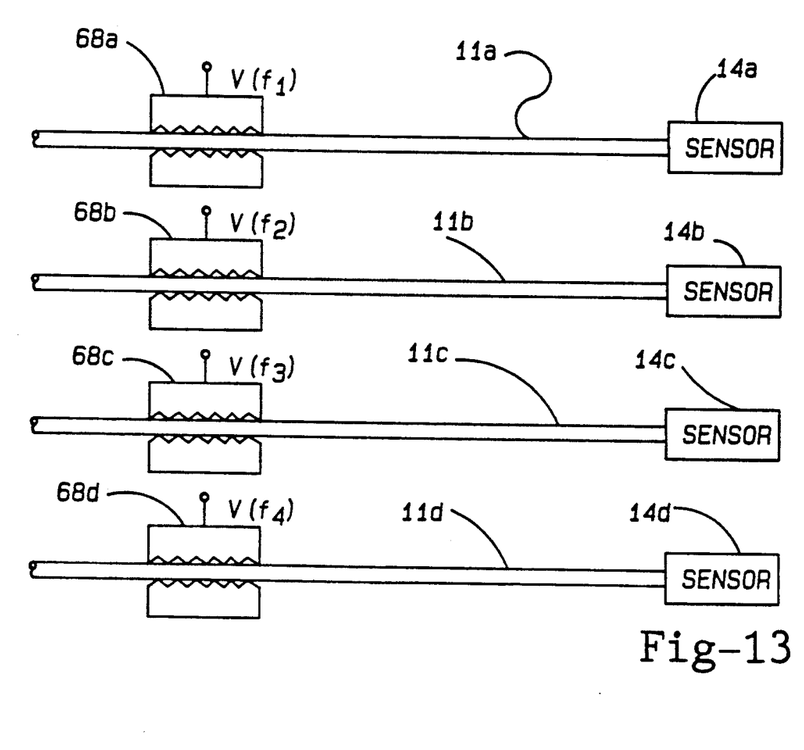
FIG. 13 shows an optical modulation system used in conjunction with the system of FIG. 11 using piezoelectric microbend attenuators.

Various modulation techniques could be used. One approach, as depicted in FIG. 12, is based on four piezoelectrically driven shutters 66a through *d* introduced between the ends of interconnecting fibers 11a through *d*. This technique requires the use of an expanded beam connector between the fibers 11a through *d* and mixing rod 70 to minimize transmission losses resulting from separation of the fibers. Alternatively, as shown in FIG. 13, piezoelectric squeezer shutters 68a through *d* apply pressure alongside the fiber. If the squeezer 68 has a tooth-like shape, intensity modulation can be induced through the microbending effect. It is further contemplated that liquid crystal shutters could be employed. This approach eliminates the use of mechanical devices and ensures long time reliability.

The shutters 66 or 68 can operate in two alternative modes. One mode requires that all four shutters continuously close and open, each at different frequency. The signals of different frequencies are separated then using phase sensitive detection. Such a detection technique offers additional benefits of improved signal-to-noise ratio.

An alternative approach requires opening and closing the shutters 66 or 68 sequentially. Each of the sensors 14a through *d* is interrogated at a different time in essentially the same manner as in the case of an individual sensor.

Each of the four channels comprises fibers 11a through *d* carry the three time division multiplexed signals corresponding to the three wavelengths 36, 38 and 40. These signals are processed by the DSP module 34 to extract the pressure and temperature information for each sensor 14a through *d*. Four pressure outputs from DSP module 34 are transmitted then in an appropriate format to an Electronic Control Module (ECM) of an automobile.

Figure 14:
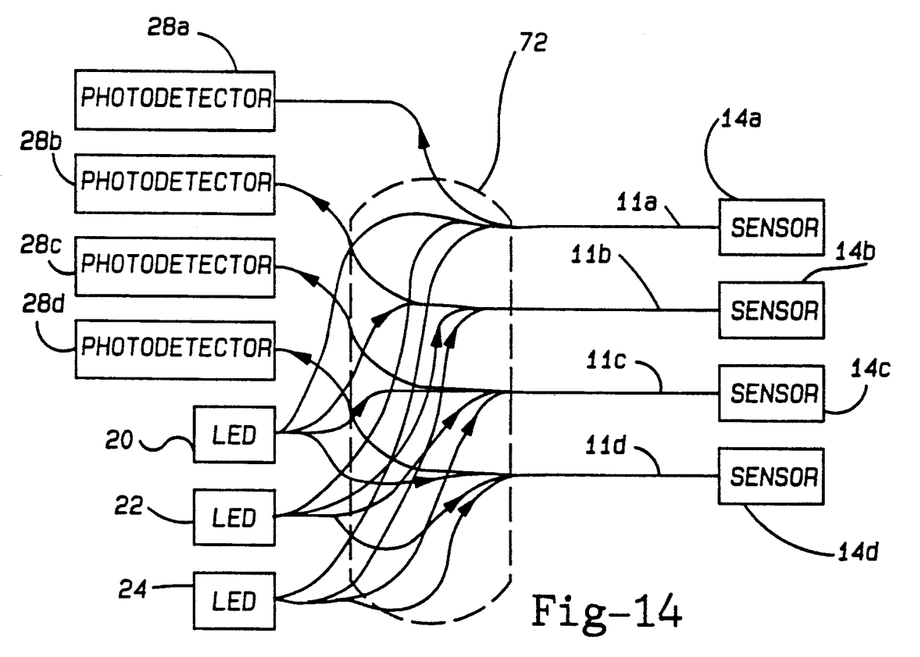
FIG. 14 is a schematic drawing of multiplexing system in which a common set of light sources is used with designated photodetectors for each sensor.

The second approach, being the subject of this disclosure is schematically depicted in FIG. 14. A time division multiplexed multiple detector design is used. Each of the three LEDs 20, 22 and 24 is connected, via a fiber lens interface 72, to each of the four sensing fibers 11a through *d*. The return signal from each of the fibers 11a through *d* is detected by individual measuring detectors 28a through *d*, provided for each sensor 14a through *d*. The signals of the four detectors 28a through *d* are processed independently, synchronized to the emitting LEDs 20, 22 and 24 the same way it is done for a single channel sensor described herein.

While the above description constitutes the preferred embodiments of the present invention, it will be appreciated that the invention is susceptible of modification, variation and change without departing from the proper scope and fair meaning of the accompanying claims.

We claim:

1. A fiber optic pressure sensor system comprising:
   an optical fiber having a sensing tip at a first end with a pressure sensitive element, said pressure sensitive element modulating a pressure sensing light signal injected into the opposite second end of said optical fiber and returning said light signal into said fiber,
   temperature sensing means for providing a temperature sensing light signal related to the temperature which said pressure sensing element is exposed to during measurement, said temperature sensing means including a filter having transmissivity affected by temperature,
   optical means for injecting said pressure sensing light signal into said fiber second end and for receiving said returned light signal, and
   signal processing means for calibrating said light pressure sensing signal modulated by said pressure sensitive element in response to said temperature sensing light signal thereby enabling accurate measurement of pressure through the range of temperatures.

2. A fiber optic pressure sensor system according to claim 1 wherein said pressure sensing tip includes a diaphragm positioned beyond said first end of said fiber which is deformable in response to pressure whereby the energy of said pressure sensing light signal reflected by said diaphragm returned to said fiber is modulated by said pressure.

3. A fiber optic pressure sensor system according to claim 1 wherein said signal processing means includes stored data relating temperature to the temperature related characteristics of said pressure sensing tip.

4. A fiber optic pressure sensor system comprising:
   an optical fiber having a sensing tip at a first end with a pressure sensitive element, said pressure sensitive element modulating a pressure sensing light signal injected into the opposite second end of said optical fiber and returning said pressure sensing light signal into said fiber,
   temperature sensing means for providing a temperature sensing light signal related to the temperature which said pressure sensing element is exposed to during measurement, said sensing tip including a filter positioned between at said fiber first end and said pressure sensitive element and having a steep transition transmissivity characteristic in a transition wavelength region and means for generating said temperature sensing light signal of a wavelength wherein transmissivity of said filter is affected by temperature and wherein said signal processing means measures the intensity of said temperature sensing light signal thereby providing a measure of said temperature,
   optical means for injecting said pressure sensing light signal into said fiber second end and for receiving said returned light signal, and
   signal processing means for calibrating said light pressure sensing signal modulated by said pressure sensitive element in response to said signal related to temperature thereby enabling accurate measurement of pressure through the range of temperatures.

5. A fiber optic pressure sensor system according to claim 4 wherein said pressure sensing light signal passes through said filter and is modulated by said pressure sensitive element.

6. A fiber optic pressure sensor system according to claim 5 further comprising means for generating a reference light signal which is fully reflected by said filter and is implemented by said signal processing means for calibrating said pressure sensing signal.

7. A fiber optic pressure sensor system according to claim 6 wherein said reference light signal has a first maximum wavelength, said temperature sensing light signal has a second maximum wavelength greater than said first wavelength, and said pressure sensing light signal has a third maximum wavelength greater than said second wavelength.

8. A fiber optic pressure sensor system according to claim 4 where said filter comprises alternate layers of dielectric material deposited onto said fiber first end.

9. A fiber optic pressure sensor system according to claim 4 wherein said transition wavelength region defines a cut-off filter exhibiting low transmission in wavelengths below said region and high transmission wavelengths above said region.

10. A fiber optic pressure sensor system according to claim 4 wherein said transition wavelength region defines a band pass filter exhibiting low transmission in wavelengths below or above said region.

11. A fiber optic pressure sensor system comprising:
an optical fiber having a sensing tip at a first end with a pressure sensitive diaphragm positioned beyond said first end which modulates the energy of a pressure sensing light signal injected into the opposite second end of said fiber which is reflected back into said fiber first end,
a frequency selective optical filter positioned at said fiber first end which allows transmission of said pressure sensing light signal within a range of operating temperatures and has a steep transmissivity transition characteristics in a transition wavelength region different from that of said pressure sensing light signal, and wherein said wavelength region displaces in wavelength in response to temperature change within said range of operating temperatures,
a temperature sensing light signal injected into said second fiber end having a wavelength band in the range of displacement of said filter cut-off curve whereby the energy of said temperature sensing light signal reflected by said filter is a function of said temperature,
optical means for generating and injecting said light signals into said fiber second end and receiving said returned light signals, and
signal processing means for calibrating said pressure sensing light signal modulated by said pressure sensitive element in response to said signal related to temperature thereby enabling accurate measurement of pressure through the range of temperatures.

12. A fiber optic pressure sensor system according to claim 11 further comprising means for generating a reference light signal which is fully reflected by said filter and is implemented by said signal processing means for calibrating said pressure sensing light signal.

13. A fiber optic pressure sensor system according to claim 12 wherein said reference light signal has a first maximum wavelength, said temperature sensing light signal has a second maximum wavelength greater than said first wavelength, and said pressure sensing light signal has a third maximum wavelength greater than said second wavelength.

14. A fiber optic pressure sensor system according to claim 11 wherein said filter comprises alternative layers of dielectric material deposited onto said fiber first end.

15. A fiber optic pressure sensor system according to claim 11 wherein said signal processing means includes stored data relating temperature to the temperature related characteristics of said pressure sensing tip.

16. A fiber optic pressure sensor system according to claim 11 wherein said transition wavelength region defines a cut-off filter exhibiting low transmission in wavelengths below said region and high transmission in wavelengths above said region.

17. A fiber optic pressure sensor system according to claim 11 wherein said transition wavelength region defines a band pass filter exhibiting low transmission in wavelengths below or above said region.

* * * * *

UNITED STATES PATENT AND TRADEMARK OFFICE
CERTIFICATE OF CORRECTION

PATENT NO. : 5,275,053
DATED : 1/4/94
INVENTOR(S) : Marek T. Wlodarczyk, et al.

It is certified that error appears in the above-indentified patent and that said Letters Patent is hereby corrected as shown below:

Column 13, Line 7, Claim 9, after "transmission" insert --in--.

Signed and Sealed this

Fourteenth Day of June, 1994

*Attest:*

BRUCE LEHMAN

*Attesting Officer*    *Commissioner of Patents and Trademarks*